(No Model.) 3 Sheets—Sheet 3.
J. Q. ADAMS.
CORN SHELLER.
No. 256,261. Patented Apr. 11, 1882.
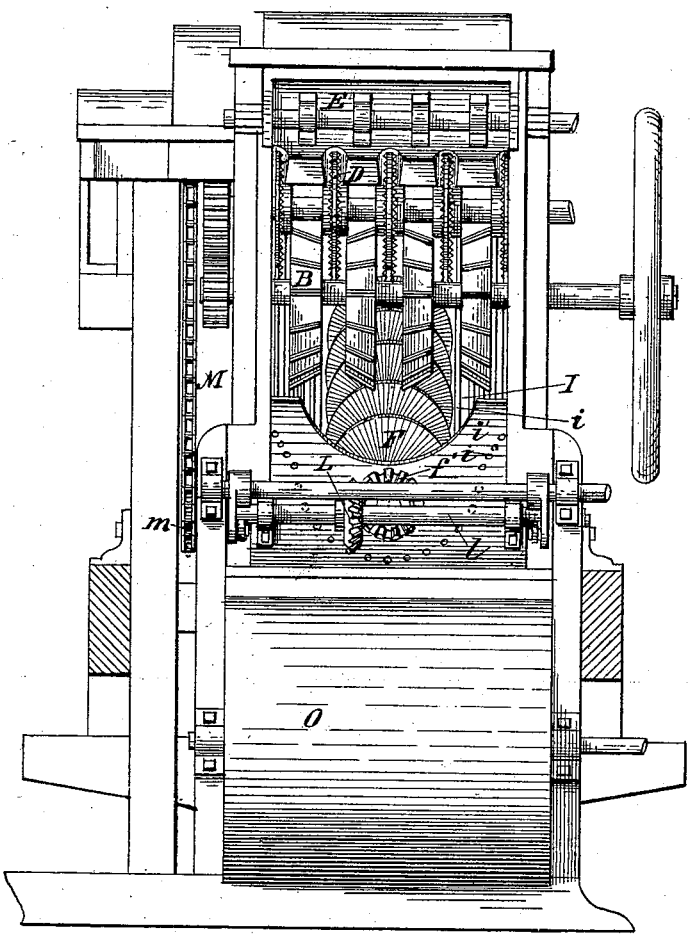
Fig 3
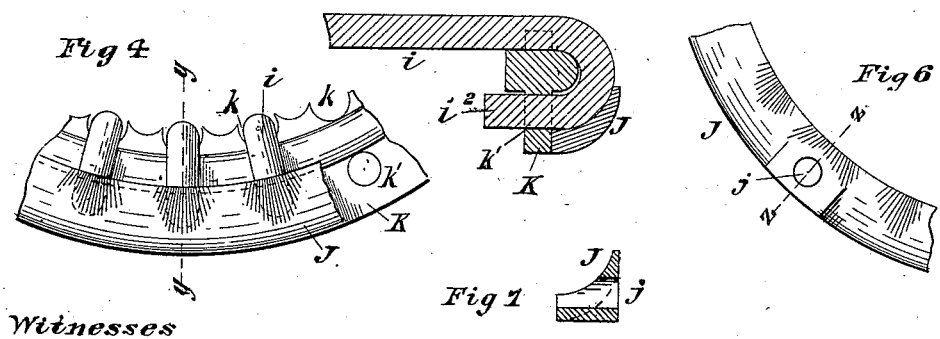
Fig 4 Fig 5 Fig 6
Fig 7
Witnesses
W. C. Corliss
Jno. C. MacGregor
Inventor
John Q. Adams
By Coburn & Thacher
Attorneys

UNITED STATES PATENT OFFICE.

JOHN Q. ADAMS, OF MARSEILLES, ILLINOIS.

CORN-SHELLER.

SPECIFICATION forming part of Letters Patent No. 256,261, dated April 11, 1882.

Application filed June 13, 1881. (No model.)

*To all whom it may concern:*

Be it known that I, JOHN Q. ADAMS, a citizen of the United States, residing at Marseilles, in the county of La Salle and State of Illinois, have invented certain new and useful Improvements in Corn-Shellers, which are fully set forth in the following specification, reference being had to the accompanying drawings, in which—

Figure 1:
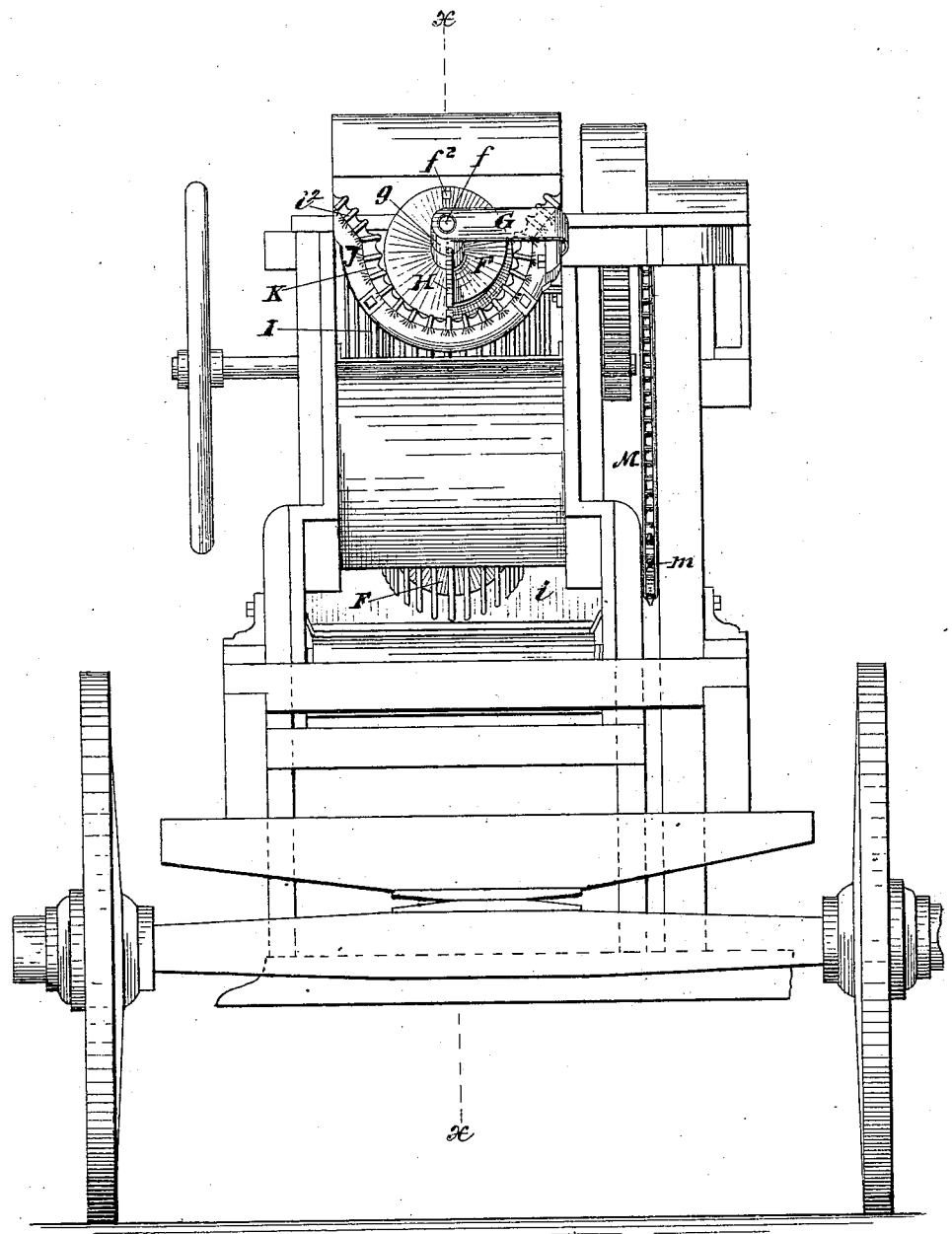
Figure 2:
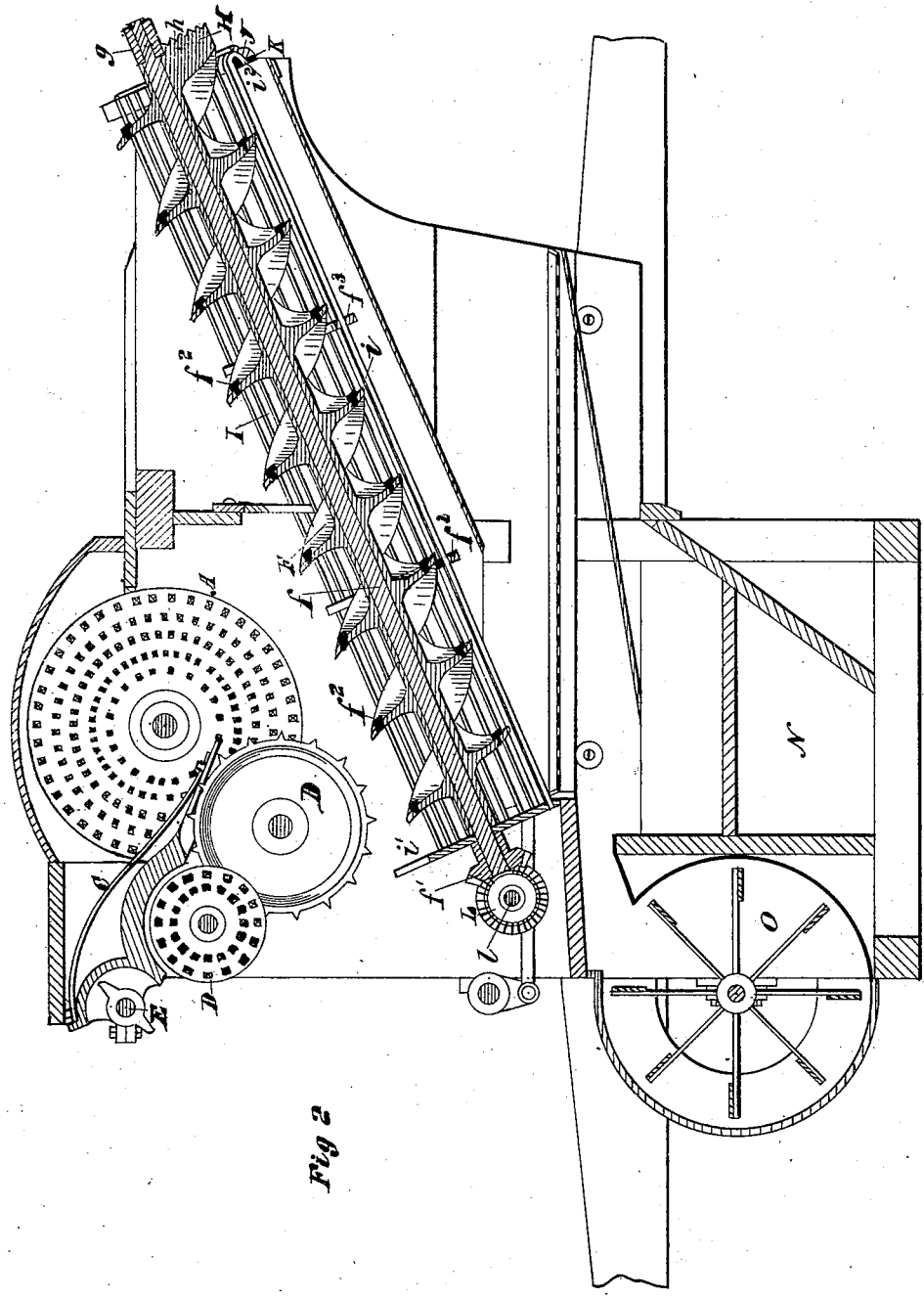

Figure 1 represents a rear end elevation of a machine embodying my improvements; Fig. 2, a longitudinal section of the same, taken on the line $x\,x$, Fig. 1; Fig. 3, a front end elevation of the same, a portion of the casing being removed; Fig. 4, a detail view on an enlarged scale, showing the device for attaching the ends of the rods forming a concave around the conveyer; Fig. 5, a cross-section of the same, taken on the line $y\,y$, Fig. 4; Fig. 6, a detail view of the outer plate of the attaching device; and Fig. 7, a cross-section of the same, taken on the line $z\,z$, Fig. 6.

My invention relates principally to certain improvements in separating mechanism for corn-shellers. A large portion of the corn crop is gathered by picking the ears without cutting up the stocks, and the ears are broken off as closely as possible, so as to leave the husks upon the stock. Corn gathered in this way is generally called "snapped" corn, and always has a portion of the husks remaining on the ears. The usual practice is to shell this corn without taking the trouble to remove these remaining husks, and therefore a large quantity of husks, silk, &c., is discharged from the shelling devices with the kernels.

In machines provided with a revolving cob-rake it has been found that the husks will go over and be finally discharged from the machine loaded with corn, and in machines provided with a shaking cob-shoe the quantity of husks, &c., mixed with the corn is such that the slats of the shoe will not take hold strongly enough to give the required forward motion to the mass until the latter has accumulated sufficiently to have considerable weight, when it is found that the mass is so great that the corn is not well separated as it is carried along over the shoe, and a quantity will be discharged from the machine with the cobs and husks.

It is the object of my present invention to obviate this difficulty and provide a separating apparatus which will operate satisfactorily upon snapped corn.

I will proceed to describe one mode in which I have practically carried out my invention, and will then point out in the claims the special improvements which I believe to be new and desire to secure by Letters Patent.

In the drawings, I have shown my improvements applied to a machine provided with straight runners A, bevel-runners B, rag-irons C, picker-wheels D, and a force-feed beater-shaft, E, all of which are well-known feeding and shelling devices and need not be described here.

It will be understood, also, that the usual elevator is used to deliver the corn to the machine, though it is not shown in the drawings, as its application will be readily understood by those familiar with this class of machines.

Below the shelling apparatus is a screw-conveyer, F, the shaft $f$ of which is inclined upward as it extends rearward, so that at the rear end of the machine, where the conveyer terminates, it is about as high as the shelling apparatus, while the forward end of the conveyer is directly under the shelling apparatus, so that the delivery from the latter is directly upon the conveyer. The front end of the shaft is provided with a bevel-pinion, $f'$, by means of which the conveyer is rotated, as hereinafter explained. This conveyer is of ordinary construction, except that on the rear faces of the spiral blades short projections $f^2$ are arranged at short distances apart, as shown in Fig. 2 of the drawings. The rear end of the conveyer-shaft is supported by a flat arm, G, attached to the frame at one side of the conveyer, and bent around in rear of the latter, as shown in Fig. 1 of the drawings, and carrying at its inner end a box or bearing, $g$, for the end of the shaft, as shown in Fig. 2 of the drawings. The extreme rear end of the conveyer-blade is straightened out and extended parallel with the shaft, so as to form a straight projection, H, the edge of which reaches just under the bearing $g$, and is preferably notched, so as to give it a series of teeth, $h$. This conveyer is placed in a concave receptacle or trough, I, which is skeleton in construction. In the drawings it is shown composed of metallic rods $i$, arranged at a slight distance apart, the lower ends being set in a suitable plate, $i'$, and the upper ends being bent to form hooks $i^2$, which are secured in place by means of two plates, J and K. The inner plate, K, has recesses $k$ in its inner edge, in which the ends of the rods lie, and a corresponding number of holes, $k'$, near the outer edge, through which the ends of the hooks on the rods are placed, as shown in Fig. 5 of the drawings. The outer plate, J, narrower than the first and curved somewhat, is then applied to the plate K, so as to cover the outer portion of the hooks, and is secured in place by bolts or screws passing through holes $j$. The plates are secured at each end to the sides of the frame of the machine, and the concave of the conveyer extends from side to side of the interior of the machine, or is connected with each side by a bevel extending from its upper margin. It passes around underneath the conveyer and is open at the top. This concave is not as long as the shaft of the conveyer, but at the upper end an open space is left between it and the arm G to permit the free discharge of the cobs, husks, &c. Stay plates or bars $f^3$ are arranged at suitable distances between the ends of the concave, the rods of which it is composed being passed through notches in these stays, and the latter being secured to the sides of the machine. The closed periphery of each notch is somewhat more than a half-circle, so that the rod cannot be easily lifted out of it, while there will be no hinderance to the passage of the husks or cobs.

The screw-conveyer is revolved by means of a bevel-pinion, L, on a counter-shaft, $l$, and arranged to engage with the similar pinion on the lower end of the conveyer-shaft. The counter-shaft is rotated by a rag-chain, M, run from a sprocket-wheel, $m$, on the shaft to a similar wheel on the main driving-shaft of the machine. The machine is also provided with a corn-shoe, N, arranged below the conveyer, and a fan-blower, O, of any ordinary construction, both of these devices being common in corn-shellers.

The operation of my improvement is as follows: The delivery being direct from the shelling mechanism to the conveyer, the mass of cobs, husks, &c., mixed with corn, falls upon the latter at the lower end. The revolution of the screw-conveyer carries the cobs, husks, silk, &c., upward toward the rear end of the machine, and being kept in constant motion, the kernels of corn are shaken out and fall between the rods of the receptacle upon the corn-shoe below, the rods being sufficiently near to each other to prevent the escape of husks or other refuse matter. To aid in the separation of the corn from the refuse the projections on the rear faces of the blades shake up and loosen the mass, so that, as I have found by actual use, a perfect separation is effected before the discharge of the refuse at the upper end of the conveyer. At the upper end of the conveyer there will be a tendency of the silk and husks mixed with it to catch and hang upon the arm which supports the conveyer-shaft, which in a short time would clog and obstruct the discharge. This is prevented by the straight projection H at the end of the conveyer, which, as it is carried around by the shaft, cleans off all material that may be gathered on the arm, and keeps the space between it and the receptacle constantly clear. As already stated, this improvement is specially intended to effect a perfect separation in shelling snapped corn, and it successfully overcomes the difficulties which have heretofore prevailed, as mentioned above. Of course it will work as successfully in separating the corn from the refuse matter, where the husking has been perfectly performed, so that it is adapted to all kinds of corn.

I have thus described one mode of carrying out my invention; but obviously the construction of parts in detail may be modified without departing from the principle of my improvement, and therefore I do not limit myself to devices precisely as herein shown and described. The concave receptacle, for instance, may be made of perforated sheet metal, or of any other material which will provide a suitable skeleton-frame to permit the passage of kernels of corn without passing the refuse. When made of rods or bars they may be of any shape and run in any direction, either parallel with the shaft of the conveyer, around it directly, or spirally. In the largest machines it may be found advisable to use two concaves side by side, each with a distinct conveyer operating in it. Obviously, also, the conveyer may be driven in some other way than that here shown, and it may applied to a machine of a different construction—that is, with other shelling devices and mechanisms.

It will be readily seen, also, that the degree of inclination given to the conveyer may be varied to almost any extent, ranging between an inclination as great as will consist with not allowing the cobs to roll back over the blades of the conveyer, and a horizontal or even declining position, the separator operating successfully on the principle which I have described under any of these conditions, inasmuch as the separation is due almost entirely to the operation of the mechanism and scarcely at all to the degree of inclination. The degree of inclination shown, however, is preferable as securing a more complete interception of the kernels which fly from the wheels during shelling, and thus preventing waste. It is also advantageous as admitting of a stationary slide under the conveyer so steep that the corn which falls on it will by its own weight slide back into the machine far enough to be cleaned on the grain-shoe without danger of being blown over.

Having thus described my invention, what I claim as new, and desire to secure by Letters Patent, is—

1. In a corn-sheller, a separating mechanism composed of the screw-conveyer and a concave receptacle for the latter of skeleton construction, arranged to receive the delivery from the shelling mechanism, substantially as described.

2. In a corn-sheller, the shelling mechanism, in combination with the skeleton trough I and screw-conveyer F, arranged underneath the shelling mechanism and extending upward and rearward in an inclined position to the rear end of the machine, substantially as described.

3. The shelling mechanism, in combination with the screw-conveyer, skeleton receptacle, and corn-shoe, substantially as described.

4. The straight runners A, in combination with the bevel-runners B, rag-irons C, screw-conveyer F, and skeleton receptacle I, substantially as described.

5. The screw-conveyer F, provided with projections $f^2$, arranged at distant intervals on the rear face of the blade, in combination with the skeleton receptacle, substantially as and for the purpose set forth.

6. The skeleton receptacle, in combination with the screw-conveyer provided with a straight section, H, at its upper end, and the shaft-supporting arm G, substantially as and for the purpose set forth.

7. The shelling mechanism, in combination with the screw-conveyer F, skeleton receptacle I, pinions $f'$ and L, and rag-chain M, running from the main shaft to the counter-shaft $l$, substantially as described.

8. The conveyer-receptacle composed of the straight rods $i$, provided with hooks $i^2$ at one end, in combination with the fastening-plates J and K and the supporting-plate $i'$, substantially as described.

J. Q. ADAMS.

Witnesses:
  ROSWELL P. ANNIN,
  OLIVER R. ADAMS.